US005302045A

United States Patent [19]

Johnsen

[11] Patent Number: 5,302,045

[45] Date of Patent: Apr. 12, 1994

[54] DEVICE FOR RELEASABLE CONNECTION OF TWO MEMBERS

[75] Inventor: Anders Johnsen, Borlänge, Sweden

[73] Assignee: Gearmec Sweden AB, Borlange, Sweden

[21] Appl. No.: 910,161

[22] PCT Filed: Nov. 19, 1990

[86] PCT No.: PCT/SE90/00745

§ 371 Date: Jul. 14, 1992

§ 102(e) Date: Jul. 14, 1992

[87] PCT Pub. No.: WO91/08074

PCT Pub. Date: Jun. 13, 1991

[30] Foreign Application Priority Data

Nov. 27, 1989 [SE] Sweden .............................. 8903984-6

[51] Int. Cl.[5] .............................................. B23B 47/00

[52] U.S. Cl. .................................... 403/322; 403/374; 403/409.1; 403/17

[58] Field of Search ............... 408/712, 110, 111, 234, 408/136; 248/316.2, 231.3, 669; 403/374, 409.1, 18, 17, 19, 20, 322, 321, DIG. 8

[56] References Cited

U.S. PATENT DOCUMENTS

| | | | |
|---|---|---|---|
| 1,316,141 | 9/1919 | Cleveland | 408/234 |
| 2,217,560 | 10/1940 | Michon | 403/DIG. 8 |
| 3,234,977 | 2/1966 | Byers | 408/712 |
| 3,387,509 | 6/1968 | Lupear | 408/76 |
| 3,464,655 | 9/1969 | Schuman | 248/669 |
| 4,500,235 | 2/1985 | Johnsen | 403/408.1 |
| 4,540,149 | 9/1985 | Rupprecht | 248/669 |
| 4,614,456 | 9/1986 | Cattani | 403/322 |

*Primary Examiner*—Randolph A. Reese
*Assistant Examiner*—Anthony Knight
*Attorney, Agent, or Firm*—Zarley, McKee, Thomte, Voorhees & Sease

[57] ABSTRACT

In a device for releasable connection of two members (2, 8) co-operating wedge surfaces (12, 17 and 13, respectively) are provided on the members. A first member (2) comprises two tightening devices (14, 16) arranged to actuate the second member (8) so that a component of the tightening force actuates the members towards each other, and another component of the tightening force actuates the wedge surfaces (12, 17 and 13, respectively) to co-operate so that also the wedge surfaces actuate the members towards each other. The device is designed for connecting the members (2, 8) in two relative positions, between which the members are rotated 180° relative to each other.

17 Claims, 6 Drawing Sheets

DEVICE FOR RELEASABLE CONNECTION OF TWO MEMBERS

FIELD OF THE INVENTION AND PRIOR ART

This invention is related to a device for releasable connection of two members according to the pre-characterizing part of the enclosed claim 1. The first member is in particular formed by a feed member, which is movable along a guide in the form of a column or the like, the second member forming or carrying a machine tool member, for instance a boring machine member.

A device according to the precharacterizing part of claim 1 has been invented before by the applicant in the present application and this known device is disclosed in the Swedish patent No. 8105607-9 (445 982). The known device involves the advantage that the feed member and the boring machine member are separable into two separate units, which considerably simplifies handling and transport of the boring assembly.

When making holes in for instance building parts, such as floor structures, walls and the like, it is often necessary to carry out boring not only in one direction along the guide of the boring assembly but also in the other opposite direction. The known device then necessitates dismantling of the column guide, separation of the feed member and boring machine member, removal of the feed member from the column guide, mounting of the feed member on the column guide in a position rotated 180°, retightening of the column guide and finally location of the boring machine member on the feed member. Such work operations are highly tiresome and time consuming.

SUMMARY OF THE INVENTION

The object of the present invention is to develop the device according to the precharacterizing part of the enclosed claim 1 so that the two members, for instance a feed member and a boring machine member to a boring assembly, become mutually connectable in two relative positions, between which the members are rotated 180° relative to each other.

This object is according to the invention achieved by providing the device with features more closely defined in the characterizing part of claim 1.

Preferable developments of the device according to the invention are defined in the dependent claims.

BRIEF DESCRIPTION OF THE DRAWINGS

With reference to the enclosed drawings, a more specific description of an embodiment of the invention cited as an example will follow hereinafter.

In the drawings.

DETAILED DESCRIPTION OF A PREFERRED EMBODIMENT

Figure 1:
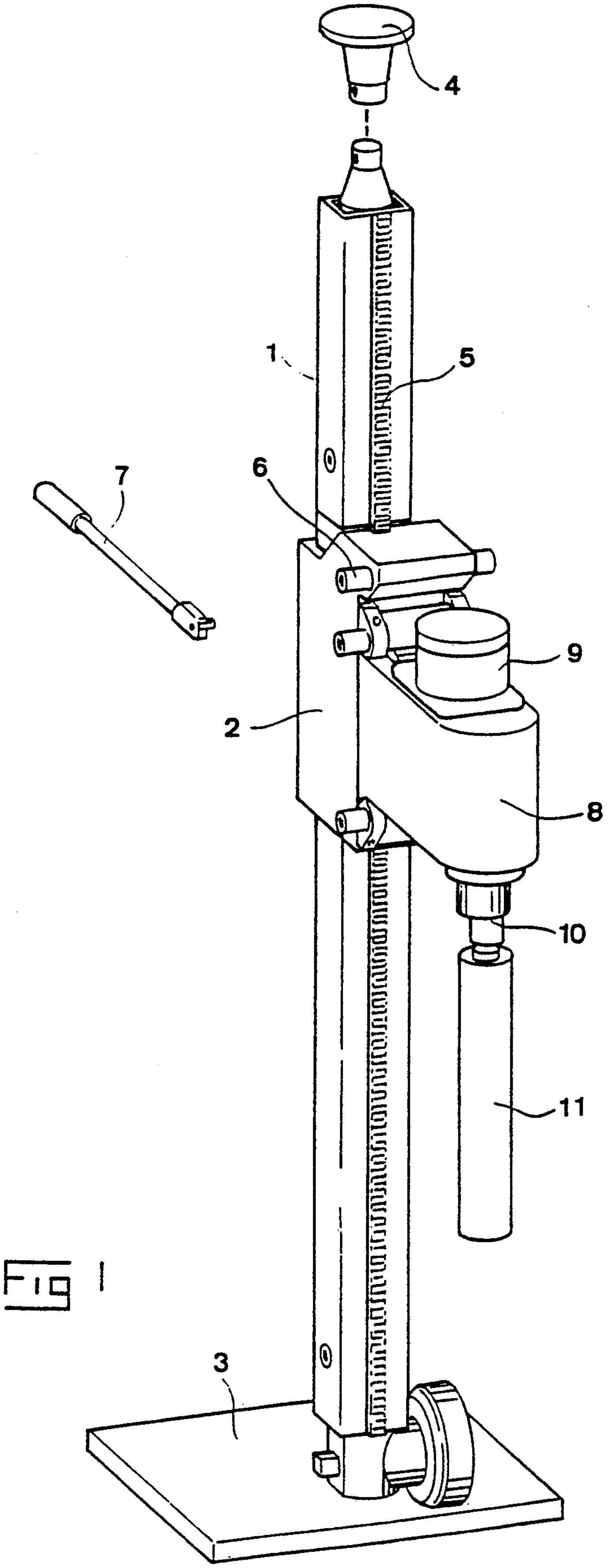
FIG. 1 is a diagrammatical perspective view illustrating a boring assembly, on which the device according to the invention is used.

A boring assembly is illustrated in FIG. 1. This assembly comprises a guide 1 forming a tread for a member 2, here designated feed member, movable along the guide. The guide 1 has the character of a column erectable by several sections. The column is arranged on a base plate 3 adapted to support against an underlayer, for instance a floor structure in a building. The other end of the column 1 may, by means of a suitable contact member 4, be clamped against an arbitrary surface, for instance a ceiling surface.

The feed member 2 has the character of carriage or slide, which by means of a suitable drive device may be displaced along the column 1. This drive device may for instance comprise a gear arranged on the feed member 2 and adapted to engage with a cog-path 5 on the column 1. This gear is rotatable in order to obtain displacement of the feed member 1 by turning a drive shaft 6, for instance manually by means of a key 7.

The feed member 2 is adapted to bring with it in its movement a boring machine member 8, which may comprise a diagrammatically indicated motor 9 and holder means 10, for instance a chuck, for holding the boring tool 11 in question.

The feed member 2 and boring machine member 8 are, when carrying out boring work, rigidly connected to each other by means of a connection device, which is releasable in order to separate the members. The members 2, 8 comprise wedge surfaces 12, 13, which are capable of being pressed into engagement with each other so as to co-operate. The member 2 comprises a tightening means 14 adapted to actuate a surface 15 on member 8 so that a component of the tightening force actuates members 2, 8 in a direction towards or against each other perpendicularly to the connection plane P illustrated in FIG. 2, whereas another component of the tightening force actuates the wedge surfaces 12, 13 to co-operate so that also the wedge surfaces actuate members 2, 8 towards or against each other perpendicularly to the connection plane P.

The member 2 comprises a second tightening means 16 for actuating the surface 15 of member 8. Furthermore, member 2 comprises a second wedge surface 17 for co-operating with wedge surface 13. The device is designed for connecting the members 2, 8 in two relative position, between which the members are rotated 180° relative to each other about an imagined axis extending perpendicularly to the connection plane P, namely a first position (FIGS. 1, 2 and 5), in which the wedge surface 12 of member 2 is in engagement with the wedge surface 13 of member 8 and the tightening means 14 actuates the inclined surface 15 of member 8, and a second position (FIG. 6), in which the wedge surface 17 of member 2 is in engagement with wedge surface 13 of member 8 and the tightening means 16 actuates the surface 15 of member 8.

The first wedge surface 12 of member 2 and the second tightening means 16 are arranged adjacent to each other but separated from the second wedge surface 17 of member 2 and the first tightening means 14, which also are arranged adjacent to each other.

The first wedge surface 12 of member 2 and that portion 18 of the second tightening means 16 which is adapted for actuating the surface 15 of member 8 are arranged beside each other and the second wedge surface 17 and that portion 19 of the first tightening means 14 which is adapted for actuation of the surface 15 are also arranged beside each other.

The first wedge surface 12 of member 2 is formed by two part surfaces 12*a* and 12*b* separated sidewardly from each other. The second wedge surface 17 is an analogical manner formed by two part surfaces 17*a* and 17*b* separated sidewardly from each other.

The actuation portion 18 of the first tightening means 16 is located between the part surfaces 12*a* and 12*b*, whereas the actuation portion 19 of the second tightening means 14 is located between the part surfaces 17*a*, 17*b*.

The inclined surface 15 has a width which is smaller than the distance between the part surfaces 12*a* and 12*b* as well as 17*a* and 17*b*. More specifically, the inclined surface 15 is arranged on a portion 20 which may have the character of a projection from member 8 and which may protrude at least partly in between elements 21, 22 and 23, 24, on which the part surfaces 12*a*, 12*b* and 17*a*, 17*b* respectively are formed.

Figure 2:
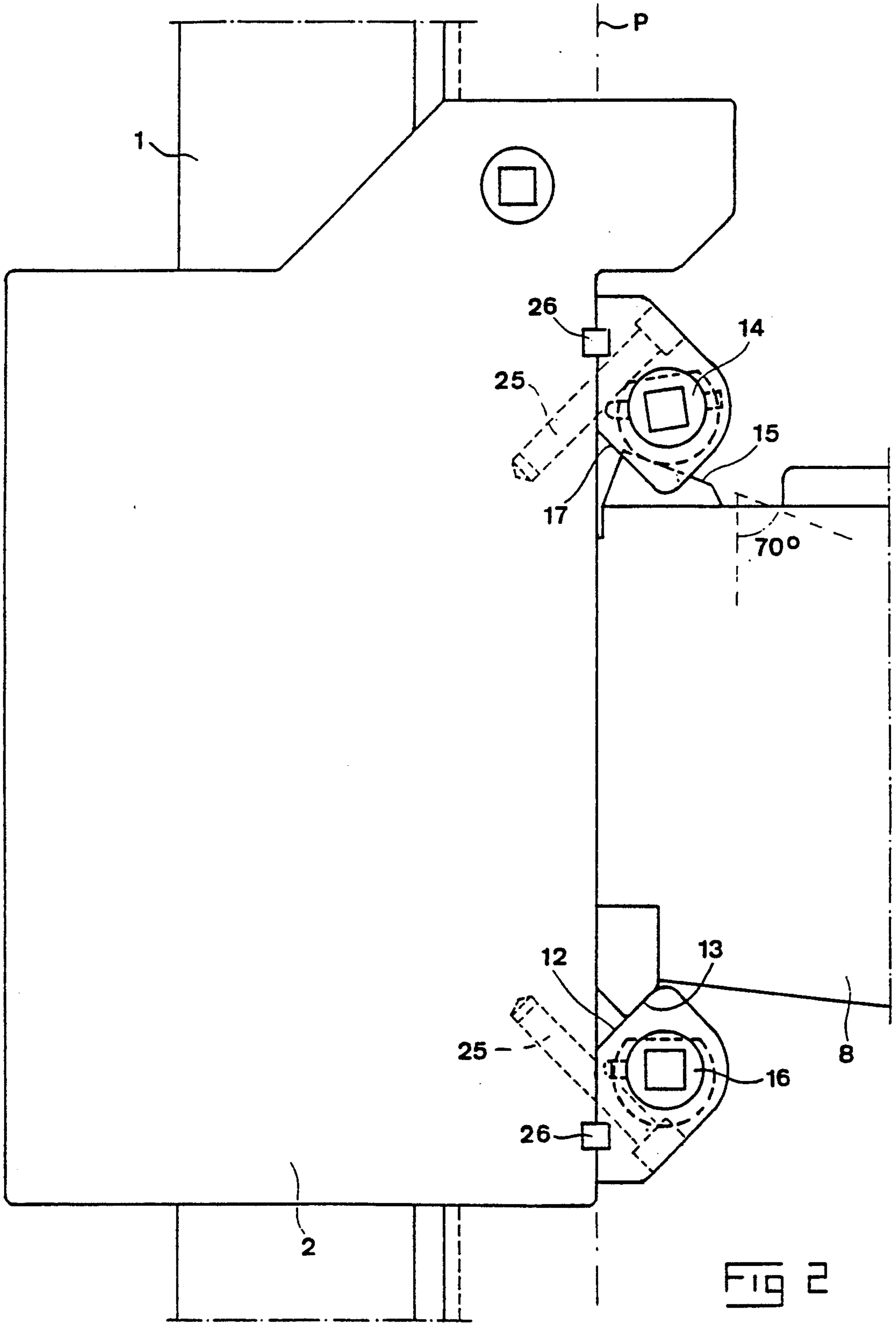
FIG. 2 is an enlarged detail view viewed obliquely from the left in FIG. 1 of the connection region between a feed member and a boring machine member of the boring assembly.

The elements 21–24 are preferably manufactured separately and afterwards secured to the rest of member 2, for instance by means of screws 25 (FIG. 2). Keys 26 may be arranged to be received between the elements and member 2 for the rest in a manner indicated in FIG. 2 to assist in counteracting displacement of the elements relative to member 2 for the rest parallel to the connection plane P.

The tightening means 14, 16 are suitably eccentrics, which at their ends are provided with cylindrical and concentrical stub axles 27 and 28 and between the latter with excentrical portions 18, 19 forming the actuation portions previously mentioned. The excentrical portions 18, 19 are cut as indicated at 30 in FIG. 6 so that a planar surface is obtained. These cuts have the purpose to ensure that the portion 20, which is provided with the surface 15, on member 8 may pass by the respective excentrical portion 18, 19 on assembly of members 2 and 8 when the eccentric 14, 16 in question is rotated to its passive, i.e. non-tightening position.

Figure 3:
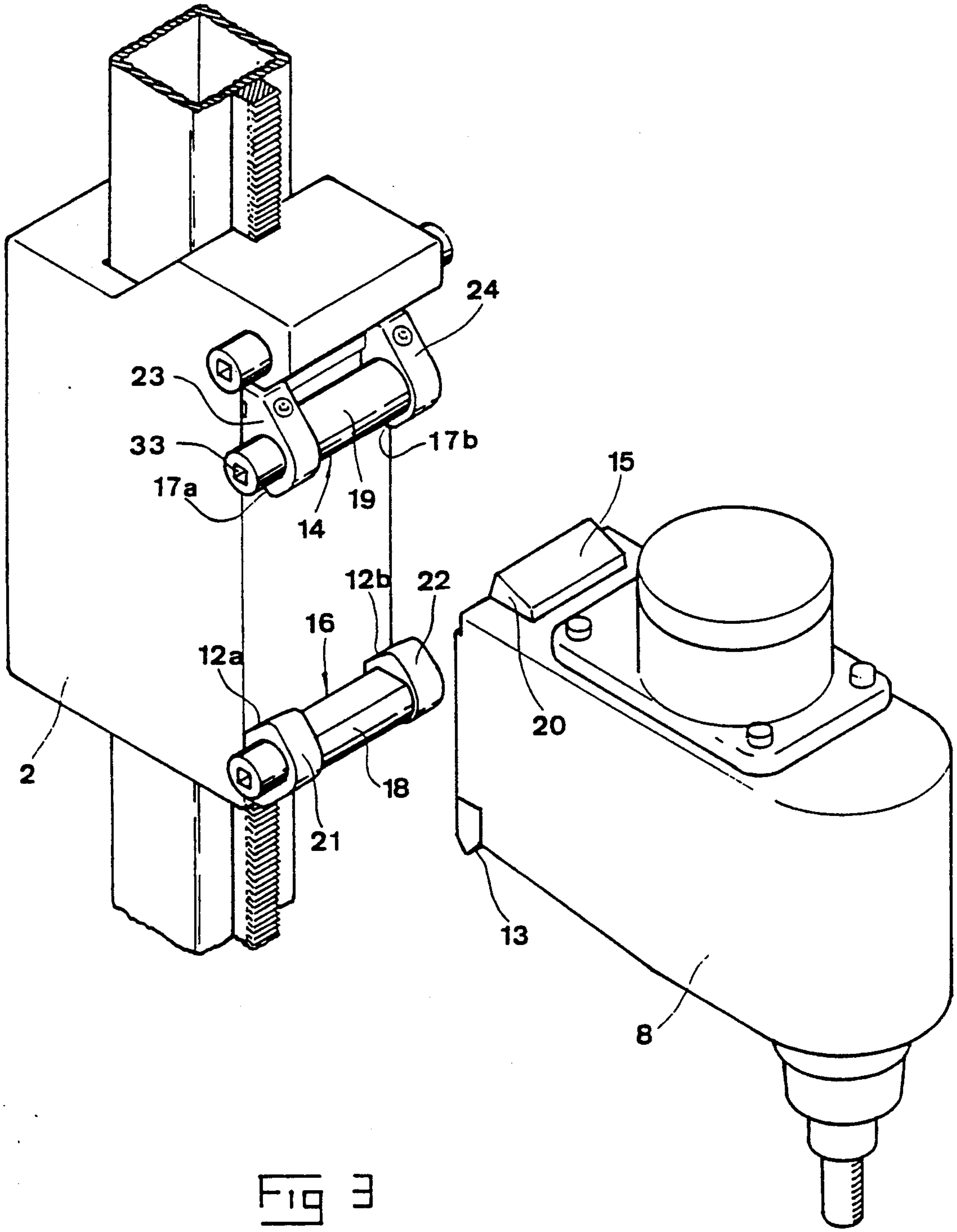
FIG. 3 is an enlarged perspective view of a part of FIG. 1, the feed member and boring machine member being illustrated as separated.
Figure 4:
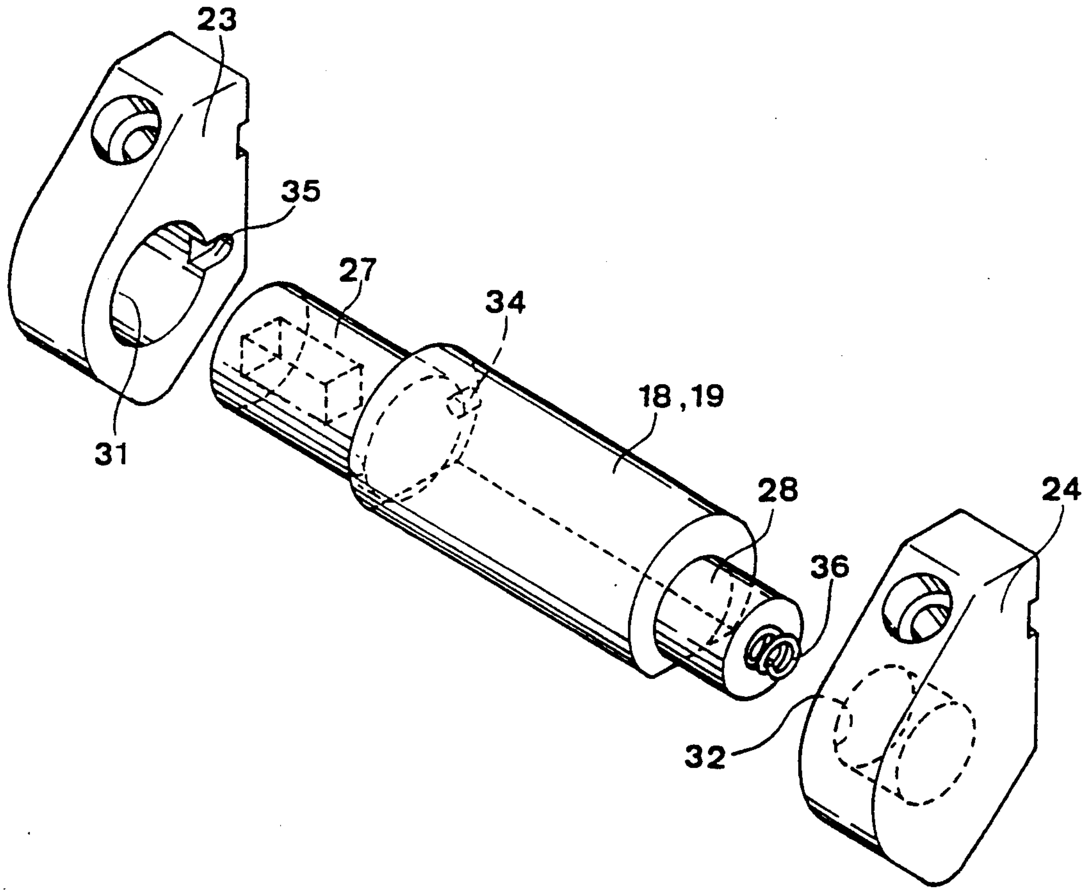
FIG. 4 is a perspective view of a tightening means according to the invention and the co-ordination thereof with elements, on which wedge surfaces are formed.

The elements 21–24 comprise, as appears in FIG. 4 for elements 23, 24, bearing holes 31, 32 for receiving the stub axles 27, 28. The bearing hole 31 is preferably extending through the element 23 and 21 respectively, the extreme portion of the stub axle 27 and a key grip 33 arranged therein, for instance a rectangular hole, becoming accessible at the outside of the element in question as appears from FIG. 3. The key 7 illustrated in FIG. 1 may for instance fit to these key grips 33.

Each of the eccentrics 14, 16 comprises (see FIG. 4) engagement means 34 for co-operating with corresponding engagement means 35 on member 2 when the eccentrics are in their passive positions, spring means 36 being arranged for axial actuation of the eccentrics in such a direction, that the engagement means engage with each other when the eccentrics are rotated to their passive positions, the engagement means 34, 35 retaining, when engaging with each other, the eccentrics against inadvertent rotation in a direction towards their active, tightening positions.

As indicated in FIG. 4 the engagement means 34 may be formed by a projection, for instance formed by the extreme end of a pin inserted into a hole in the stub axel 27, whereas the engagement means 35 is formed in element 23 and 21 respectively and has the character of a recess, in which the projection 34 fits.

The bearing holes 32 in elements 22, 24 are formed by blind holes, the bottoms of which form abutments for the spring means 36, which are formed by schrew compression springs received in holes extending into the eccentrics 14, 16 through the end surfaces of the stub axles 28. Accordingly, this spring 36 tends to displace the respective eccentrics 14, 16 to the left in FIG. 3 so that the projections 34 fall into the recesses 35 when the eccentrics are rotated to their passive positions. When the operator then wishes to bring the eccentrics to their active, tightening positions, he must first press the eccentrics inwardly somewhat in axial direction so that the springs 36 are compressed and the projections 34 exit from the recesses 35, whereafter rotation of the eccentrics can be carried out.

As clearly appears from FIG. 2, the wedge surfaces 12, 17 on member 2 are so mutually arranged that they converge in a direction outwardly from member 2. Moreover, each of the wedge surfaces 12, 17 forms an angle of generally 45° relative to the connection plane P. The latter angle of about 45° is also due for the wedge surface 13 of member 8, which wedge surface 13 may be in the form of a single continuous surface or possibly two separated part surfaces contacting the part surfaces 12*a*, 12*b* and 17*a*, 17*b* respectively.

The inclined surface 15, against which the eccentrics 14, 16 are tightened in the connecting position, forms an angle to the connection plane P which is at least 45°. preferably at least 50 and most preferably at least 60°. In the embodiment the angle between the surface 15 and connection plane P is about 70° (see FIG. 2). This angle is chosen so as to enable the portion 20 comprising the inclined surface 15 on member 8 to be pivoted past the respective eccentric 14, 16 when the wedge surface of member 8 is provisionally hooked on to the wedge surface in question on member 2.

Figure 5:
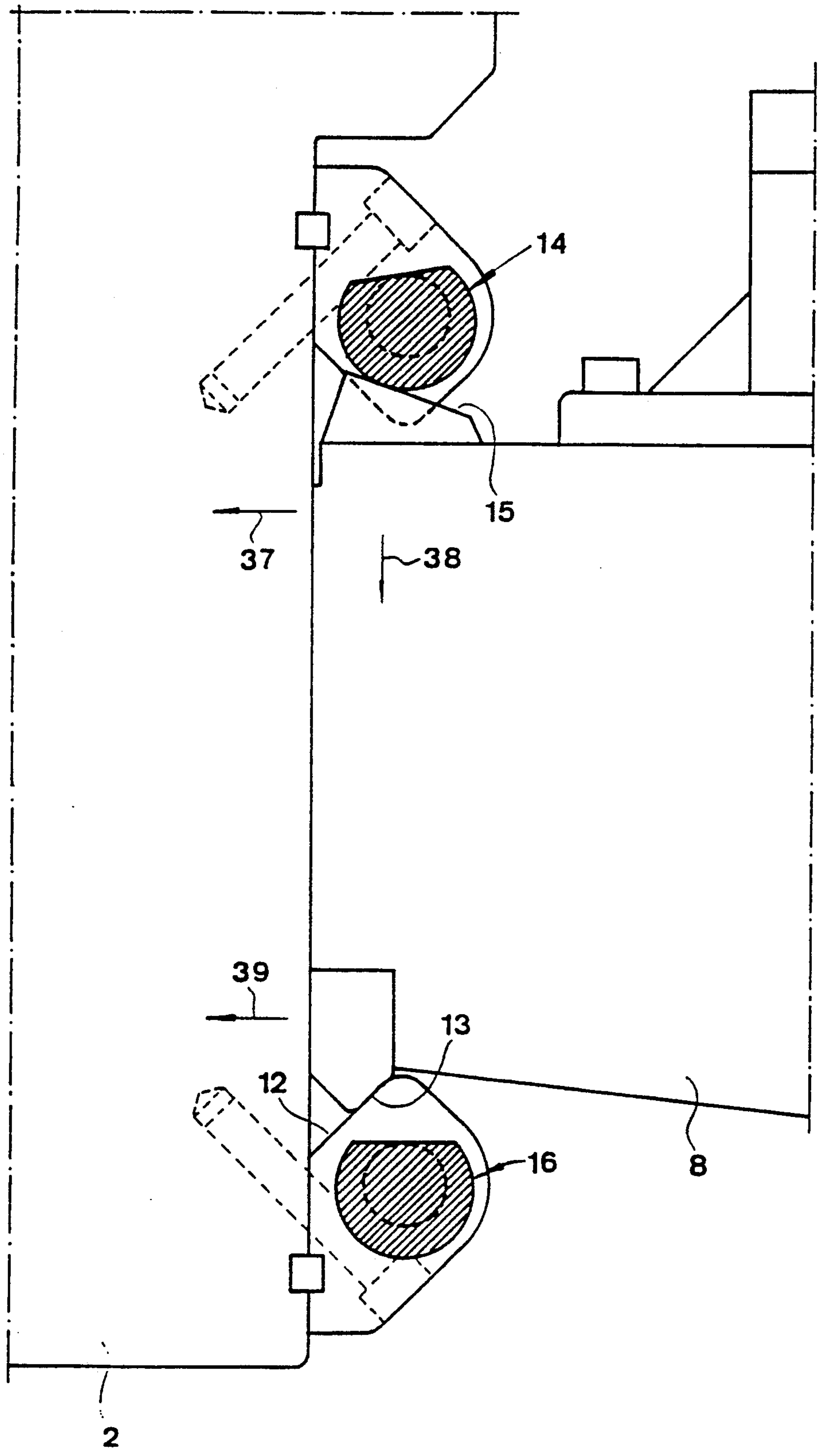
FIG. 5 is a side view similar to the view in FIG. 2 but illustrating the tightening means cut.

The device described operates in the following manner: when boring is to be carried out downwardly, the connection is carried out so that the situation in FIG. 5 is achieved. The eccentrics 14, 16 are then initially adjusted so that the planar surfaces 30 are facing towards each other. The member 2 is first hooked on to engagement with the wedge surface 12 by means of its wedge surface 13, whereupon member 2 is pivoted upwardly so that the inclined surface 15 passes by the eccentric 14. The eccentric 14 is then rotated so that its excentrical portion 19 presses on to the inclined surface 15. This means that a component 37 of the tightening force actuates members 2 and 8 against each other, whereas another component 38 makes the wedge surfaces 12, 13 to co-operate so that also thereby a force component 39 is achieved, which actuates members 2 and 8 in a direction against each other.

Figure 6:
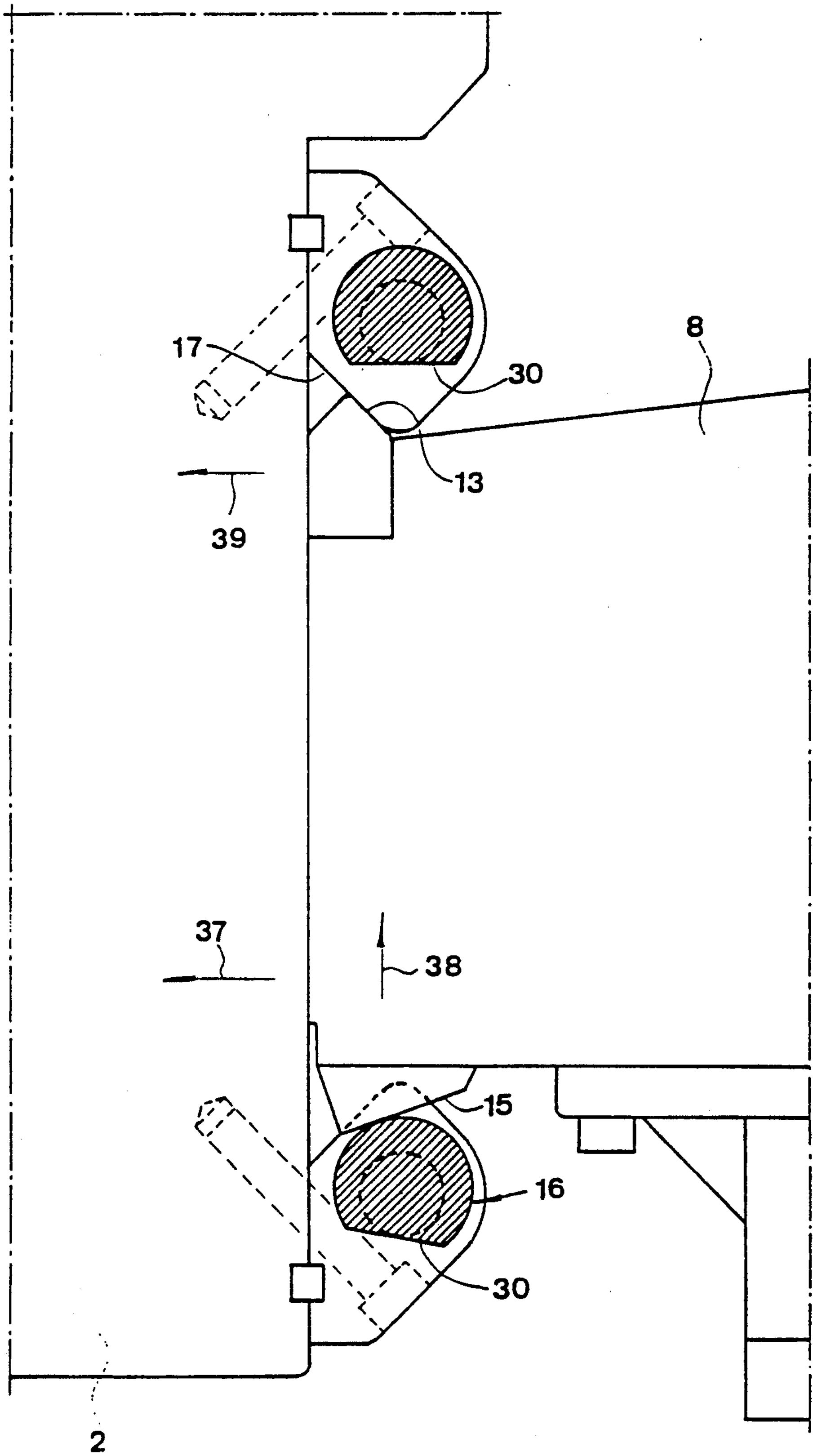
FIG. 6 is a side view similar to FIG. 5 but illustrating the boring machine member secured to the feed member in a position rotated 180° relative to the position in FIG. 5.

If the operator instead wishes to carry out boring work upwardly, he connects members 2 and 8 according to FIG. 6, i.e. the wedge surfaces 13 and 17 are brought to engagement with each other and the inclined surface 15 is then moved past the eccentric 16. The eccentric is then rotated in the tightening direction so that also in this case the force components 37–39 discussed with assistance of FIG. 5 are obtained, said force components ensuring a rigid connection between the members.

The scope of invention is of course not only delimited to the embodiment described. Thus, the invention is applicable for connection of any members and not only members included in boring assemblies. In case the first member 2 has the character of a member movable along a guide 1, it should be emphasized that the guide 1 by no means is delimited to only vertical extent. Thus, the guide 1 could extend horizontally and in more or less inclined positions, and this is also applicable on the use with boring assemblies and other machine tools.

I claim:

1. A device for releasable connection of two members (2, 8), which comprises wedge surfaces (12, 13) adapted to cooperate by being pressed into engagement with each other, a first (2) of said members comprising a tightening means (14) adapted to actuate the second member so that a component (37) of the tightening force actuates the members towards each other whereas a second component (38) of the tightening force actuates the wedge surfaces to co-operate so that the wedge surfaces also actuate the members towards each other, characterized in that the first member, in addition to the first mentioned tightening means, comprises a second tightening means (16) for actuating the second member (8), that the first member (2), in addition to its first mentioned wedge surface, comprises a second wedge surface (17) for co-operating with the wedge surface (13) of the second member, that the device is adapted for connecting the members in two relative positions, between which the members are rotated generally 180° relative to each other, namely a first position, in which the first wedge surface (12) of the first member (2) is in engagement with the wedge surface (13) of the second member and the first tightening means (14) actuates the second member whereas the second tightening means (16) is inactive, and a second position, in which the second wedge surface (17) of the first member is in engagement with the wedge surface (13) of the second member and the second tightening means (16) actuates the second member whereas the first tightening means (14) is inactive, that the first wedge surface (12) of the first member and that portion (18) of the second tightening means (16) which is arranged for actuating the second member, are arranged beside each other and that also the second wedge surface (17) of the first member and that portion (19) of the first tightening means (14) which is adapted for actuating the second member, are arranged beside each other.

2. A device according to claim 1, characterized in that the tightening means are eccentrics.

3. A device according to claim 1 characterized in that the first and second wedge surfaces (12, 17) of the first member are each formed by at least two separated part surfaces, and wherein portions (21-24) on which part surfaces (12*a*, 12*b*; 17*a*, 17*b*) are formed, comprise bearing holes (31, 32) for receiving stub axles on the tightening means.

4. A device for releasable connection of two members (2, 8), which comprise wedge surfaces (12, 13) adapted to co-operate by being pressed into engagement with each other, a first (2) of said members comprising a tightening means (14) adapted to actuate the second member so that a component (37) of the tightening force actuates the members towards each other whereas a second component (38) of the tightening force actuates the wedge surfaces to co-operate so that the wedge surfaces also actuate the members towards each other, characterized in that the first member, in addition to the first mentioned tightening means, comprises a second tightening means (16) for actuating the second member (8), that the first member (2), in addition to its first mentioned wedge surface, comprises a second wedge surface (17) for co-operating with the wedge surface (13) of the second member, that the device is adapted for connecting the members in two relative positions, between which the members are rotated generally 180° relative to each other, namely a first position, in which the first wedge surface (12) of the first member (2) is in engagement with the wedge surface (13) of the second member and the first tightening means (14) actuates the second member whereas the second tightening means (16) is inactive, and a second position, in which the second wedge surface (17) of the first member is in engagement with the wedge surface (13) of the second member and the second tightening means (16) actuates the second member whereas the first tightening means (14) is inactive, that the first wedge surface (12) of the first member and that portion (18) of the second tightening means (16) which is arranged for actuating the second member, are arranged beside each other and that also the second wedge surface (17) of the first member and that portion (19) of the first tightening means (14) which is adapted for actuating the second member, are arranged beside each other and, that the first and second wedge surfaces (12, 17) of the first member are each formed by at least two separated part surfaces (12*a*, 12*b*; 17*a*, 17*b*).

5. A device according to claim 4, characterized in that the tightening means are eccentrics.

6. A device according to claim 5, characterized in that portions (21–24) on which part surfaces (12*a*, 12*b*; 17*a*, 17*b*) are formed, comprise bearing holes (31, 32) for receiving stub axles on the eccentrics.

7. A device for releasable connection of two members (2, 8), which comprise wedge surfaces (12, 13) adapted to co-operate by being pressed into engagement with each other, a first (2) of said members comprising a tightening means (14) adapted to actuate the second member so that a component (37) of the tightening force actuates the members towards each other whereas a second component (38) of the tightening force actuates the wedge surfaces to co-operate so that the wedge surfaces also actuate the members towards each other, characterized in that the first member, in addition to the first mentioned tightening means, comprises a second tightening means (16) for actuating the second member (8), that the first member (2), in addition to its first mentioned wedge surface, comprises a second wedge surface (17) for co-operating with the wedge surface (13) of the second member, that the device is adapted for connecting the members in two relative positions, between which the members are rotated generally 180° relative to each other, namely a first position, in which the first wedge surface (12) of the first member (2) is in engagement with the wedge surface (13) of the second member and the first tightening means (14) actuates the second member whereas the second tightening means (16) is inactive, and a second position, in which the second wedge surface (17) of the first member is in engagement with the wedge surface (13) of the second member and the second tightening means (16) actuates the second member whereas the first tightening means (14) is inactive, that the first wedge surface (12) of the first member and that portion (18) of the second tightening means (16) which is arranged for actuating the second member, are arranged beside each other and that also the second wedge surface (17) of the first member and that portion (19) of the first tightening means (14) which is adapted for actuating the second member, are arranged beside each other and, that the first and second wedge surface (12, 17) of the first member are each formed by at least two separated part surfaces (12*a*, 12*b*; 17*a*, 17*b*) and, that the portion (19) of the first tightening means (14) adapted for actuating the second member is located between the part surfaces (17*a*, 17*b*) forming the second wedge surface of the first member, whereas the portion (18) of the second tightening means (16) adapted for actuating the second member is located between the part surfaces (12*a*, 12*b*) forming the first wedge surface of the first member.

8. A device according to claim 7, characterized in that the tightening means are eccentrics.

9. A device according to claim 8, characterized in that portions (21–24) on which part surfaces (12*a*, 12*b*; 17*a*, 17*b*) are formed, comprise bearing holes (31, 32) for receiving stub axles on the eccentrics.

10. A device for releasable connection of two members (2, 8), which comprise wedge surfaces (12, 13) adapted to co-operate by being pressed into engagement with each other, a first (2) of said members comprising a tightening means (14) adapted to actuate the second member so that a component (37) of the tightening force actuates the members towards each other whereas a second component (38) of the tightening force actuates the wedge surfaces to co-operate so that the wedge surfaces also actuate the members towards each other, characterized in that the first member, in addition to the first mentioned tightening means, comprises a second tightening means (16) for actuating the second member (8), that the first member (2), in addition to its first mentioned wedge surface, comprises a second wedge surface (17) for co-operating with the wedge surface (13) of the second member, that the device is adapted for connecting the members in two relative positions, between which the members are rotated generally 180° relative to each other, namely a first position, in which the first wedge surface (12) of the first member (2) is in engagement with the wedge surface (13) of the second member and the first tightening means (14) actuates the second member whereas the second tightening means (16) is inactive, and a second position, in which the second wedge surface (17) of the first member is in engagement with the wedge surface (13) of the second member and the second tightening means (16) actuates the second member whereas the first tightening means (14) is inactive, that the first wedge surface (12) of the first member and that portion (18) of the second tightening means (16) which is arranged for actuating the second member, are arranged beside each other and that also the second wedge surface (17) of the first member and that portion (19) of the first tightening means (14) which is adapted for actuating the second member, are arranged beside each other and, that the first and second wedge surfaces (12, 17) of the first member are each formed by at least two separated part surfaces (12*a*, 12*b*; 17*a*, 17*b*) and, that the portion (19) of the first tightening means (14) adapted for actuating the second member is located between the part surfaces (17*a*, 17*b*) forming the second wedge surface of the first member, whereas the portion (18) of the second tightening means (16) adapted for actuating the second member is located between the part surfaces (12*a*, 12*b*) forming the first wedge surface of the first member and that the first and second tightening means (14, 16) are arranged to actuate the second member on an inclined surface (15), the width of which is smaller than the distance between the part surfaces forming the first and the second wedge surface.

11. A device according to claim 10, characterized in that the inclined surface (15) is arranged on a portion (20), which is receivable between portions (21–24), on which the part surfaces are formed.

12. A device according to claim 11, characterized in that the tightening means are eccentric.

13. A device according to claim 10, characterized in that the tightening means are eccentrics.

14. A device according to claim 13, characterized in that portions (21–24) on which part surfaces (12*a*, 12*b*; 17*a*, 17*b*) are formed, comprise bearing holes (31, 32) for receiving stub axles on the eccentrics.

15. A device according to claim 10 characterized in that the first and second wedge surfaces (12, 17) of the first member are each formed by at least two separated part surfaces, and wherein portions (21–24) on which part surfaces (12*a*, 12*b*; 17*a*, 17*b*) are formed, comprise bearing holes (31, 32) for receiving stub axles on the tightening means.

16. A device for releasable connection of two members (2, 8), which comprise wedge surfaces (12, 13) adapted to co-operate by being pressed into engagement with each other, a first (2) of said members comprising an eccentric tightening means (14) adapted to actuate the second member so that a component (37) of the tightening force actuates the members towards each other whereas a second component (38) of the tightening force actuates the wedge surfaces to co-operate so that the wedge surfaces also actuate the members towards each other, characterized in that the first member, in addition to the first mentioned tightening means, comprises a second eccentric tightening means (16) for actuating the second member (8), that the first member (2), in addition to its first mentioned wedge surface, comprises a second wedge surface (17) for co-operating with the wedge surface (13) of the second member, that the device is adapted for connecting the members in two relative positions, between which the members are rotated generally 180° relative to each other, namely a first position, in which the first wedge surface (12) of the first member (2) is in engagement with the wedge surface (13) of the second member and the first tightening means (14) actuates the second member whereas the second tightening means (16) is inactive, and a second position, in which the second wedge surface (17) of the first member is in engagement with the wedge surface (13) of the second member and the second tightening means (16) actuates the second member whereas the first tightening means (14) is inactive, that the first wedge surface (12) of the first member and that portion (18) of the second tightening means (16) which is arranged for actuating the second member, are arranged beside each other and that also the second wedge surface (17) of the first member and that portion (19) of the first tightening means (14) which is adapted for actuating the second member, are arranged beside each other and, that each of said eccentrics (14, 16) comprises engagement means (34) for cooperating with corresponding engagement means on the first member when the eccentrics are in their passive positions, and that spring means (36) is adapted for axial actuation of the eccentrics in such a direction that the engagement means engage with each other when the eccentrics are rotated to their passive positions, said engagement means, when engaging each other, retaining the eccentrics against inadvertent rotation in a direction towards their active positions.

17. A device according to claim 16, characterized in that the first member (2) is movable along a guide (1) whereas the second member (8) forms or carries a boring machine.

* * * * *